United States Patent
Qiu et al.

(10) Patent No.: US 9,267,799 B2
(45) Date of Patent: Feb. 23, 2016

(54) METHOD AND APPARATUS OF MONITORING AND TRACKING OPTICAL FREQUENCY DIFFERENCES OF MODULATED BEAMS

(71) Applicant: Honeywell International Inc., Morristown, NJ (US)

(72) Inventors: Tiequn Qiu, Glendale, AZ (US); Waymon Ho, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 167 days.

(21) Appl. No.: 14/187,589

(22) Filed: Feb. 24, 2014

(65) Prior Publication Data

US 2015/0241218 A1    Aug. 27, 2015

(51) Int. Cl.
*G01C 19/72*     (2006.01)
*G01C 21/00*     (2006.01)
*G02F 2/00*      (2006.01)

(52) U.S. Cl.
CPC ............ *G01C 19/722* (2013.01); *G01C 19/727* (2013.01); *G01C 21/00* (2013.01); *G02F 2/00* (2013.01); *G01C 19/72* (2013.01)

(58) Field of Classification Search
CPC .... G01C 19/72; G01C 19/721; G01C 19/722; G02F 2/00; G02F 1/2252
See application file for complete search history.

(56) References Cited

U.S. PATENT DOCUMENTS

| | | | |
|---|---|---|---|
| 4,135,822 A | 1/1979 | Ezekiel | |
| 4,653,920 A | 3/1987 | Geen | |
| 4,796,993 A | 1/1989 | Sonobe et al. | |
| 4,848,910 A * | 7/1989 | Dupraz | G01R 15/246 356/460 |
| 5,080,489 A | 1/1992 | Nishikawa et al. | |
| 5,327,213 A | 7/1994 | Blake et al. | |
| 5,384,637 A | 1/1995 | Sanders et al. | |

(Continued)

FOREIGN PATENT DOCUMENTS

| | | |
|---|---|---|
| EP | 0160450 | 11/1985 |
| EP | 0189907 | 1/1986 |
| EP | 2428767 | 3/2012 |

OTHER PUBLICATIONS

Huang et al., "Synthetic heterodyne detection in a fiber-optic ring-laser gyro", "Optics Letter", Jan. 1, 1993, pp. 81-83, vol. 18, No. 1, Publisher: IEEE.

(Continued)

*Primary Examiner* — Michael P Lapage
(74) *Attorney, Agent, or Firm* — Fogg & Powers LLC (57) ABSTRACT

A method of measuring beat frequency comprises modulating a first optical signal and a second optical signal, wherein the first modulated optical signal includes a first carrier frequency and a first plurality of sideband frequencies and the second modulated optical signal includes a second carrier frequency and a second plurality of sideband frequencies. The method also comprises combining a fraction of the first modulated optical signal with a fraction of the second modulated optical signal into a combined signal and determining a carrier beat frequency. The method further comprises selecting a frequency range from the combined signal; performing a fast Fourier transform (FFT) on an electrical signal representing the selected frequency range; tracking the carrier beat frequency based on the FFT; and outputting a rate signal based on the tracked carrier beat frequency, the rate signal indicating a rotation rate of the resonator fiber optic gyroscope.

11 Claims, 5 Drawing Sheets

(56) References Cited

U.S. PATENT DOCUMENTS

| | | | |
|---|---|---|---|
| 5,485,273 A | | 1/1996 | Mark et al. |
| 5,627,644 A | * | 5/1997 | Sanders ............... G01C 19/721 356/464 |
| 5,701,177 A | * | 12/1997 | Kumagai ............. G01C 19/721 356/463 |
| 5,898,496 A | | 4/1999 | Huang et al. |
| 6,429,939 B1 | | 8/2002 | Bennett et al. |
| 7,167,250 B2 | | 1/2007 | Chen et al. |
| 7,372,574 B2 | | 5/2008 | Sanders et al. |
| 7,889,351 B2 | | 2/2011 | Strandjord et al. |
| 8,068,233 B2 | | 11/2011 | Qiu et al. |
| 8,213,019 B2 | | 7/2012 | Strandjord et al. |
| 8,223,341 B2 | | 7/2012 | Strandjord et al. |
| 8,294,900 B2 | | 10/2012 | Strandjord et al. |
| 8,446,589 B2 | | 5/2013 | Strandjord et al. |
| 2003/0128365 A1 | * | 7/2003 | Strandjord ........... G01C 19/721 356/460 |
| 2009/0082691 A1 | | 3/2009 | Denison et al. |
| 2010/0225923 A1 | * | 9/2010 | Strandjord ........... G01C 19/727 356/461 |
| 2015/0098088 A1 | * | 4/2015 | Qiu ...................... G01C 19/727 356/461 |

OTHER PUBLICATIONS

European Patent Office, "Extended European Search Report from EP Application No. 15154767.6 mailed Aug. 20, 2015", "from Foreign Counterpart of U.S. Appl. No. 14/187,589", Aug. 20, 2015, pp. 1-8, Published in: EP.

* cited by examiner

METHOD AND APPARATUS OF MONITORING AND TRACKING OPTICAL FREQUENCY DIFFERENCES OF MODULATED BEAMS

BACKGROUND

Gyroscopes (also referred to herein as gyros) have been used to measure rotation rates or changes in angular velocity about an axis of rotation. A basic conventional fiber-optic gyro (FOG) includes a light source, a beam-generating device, and a coil of optical fiber coupled to the beam generating device that encircles an area. The beam-generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In a conventional resonator FOG (RFOG), the counter-propagating light beams are typically monochromatic (e.g., in a single frequency) and circulate through multiple turns of the fiber-optic coil and for multiple passes through the coil using a device, such as a fiber coupler, that redirects light that has passed through the coil back into the coil again (i.e., circulates the light). The beam-generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength $\lambda$ is referred to as "on resonance" when the round trip resonator pathlength is equal to an integral number of wavelengths. A rotation about the axis of the coil produces a different pathlength for clockwise and counterclockwise propagation, thus producing a shift between the respective resonance frequencies of the resonator. The frequency difference, such as may be measured by tuning the CW beam and CCW beam frequencies to match the resonance frequency shift of the closed optical path due to rotation, indicates the rotation rate.

SUMMARY

In one embodiment, a method of measuring beat frequency in a resonator fiber optic gyroscope is provided. The method comprises modulating a first optical signal from a first light source and a second optical signal from a second light source, wherein the first modulated optical signal includes a first carrier frequency and a first plurality of sideband frequencies and the second modulated optical signal includes a second carrier frequency and a second plurality of sideband frequencies. The method also comprises combining a fraction of the first modulated optical signal with a fraction of the second modulated optical signal into a combined signal and determining a carrier beat frequency between the first carrier frequency and the second carrier frequency. The method further comprises selecting a frequency range from the combined signal that is close to and includes the carrier beat frequency; performing a fast Fourier transform (FFT) on an electrical signal representing the selected frequency range; tracking the carrier beat frequency based on the FFT; and outputting a rate signal based on the tracked carrier beat frequency, the rate signal indicating a rotation rate of the resonator fiber optic gyroscope.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
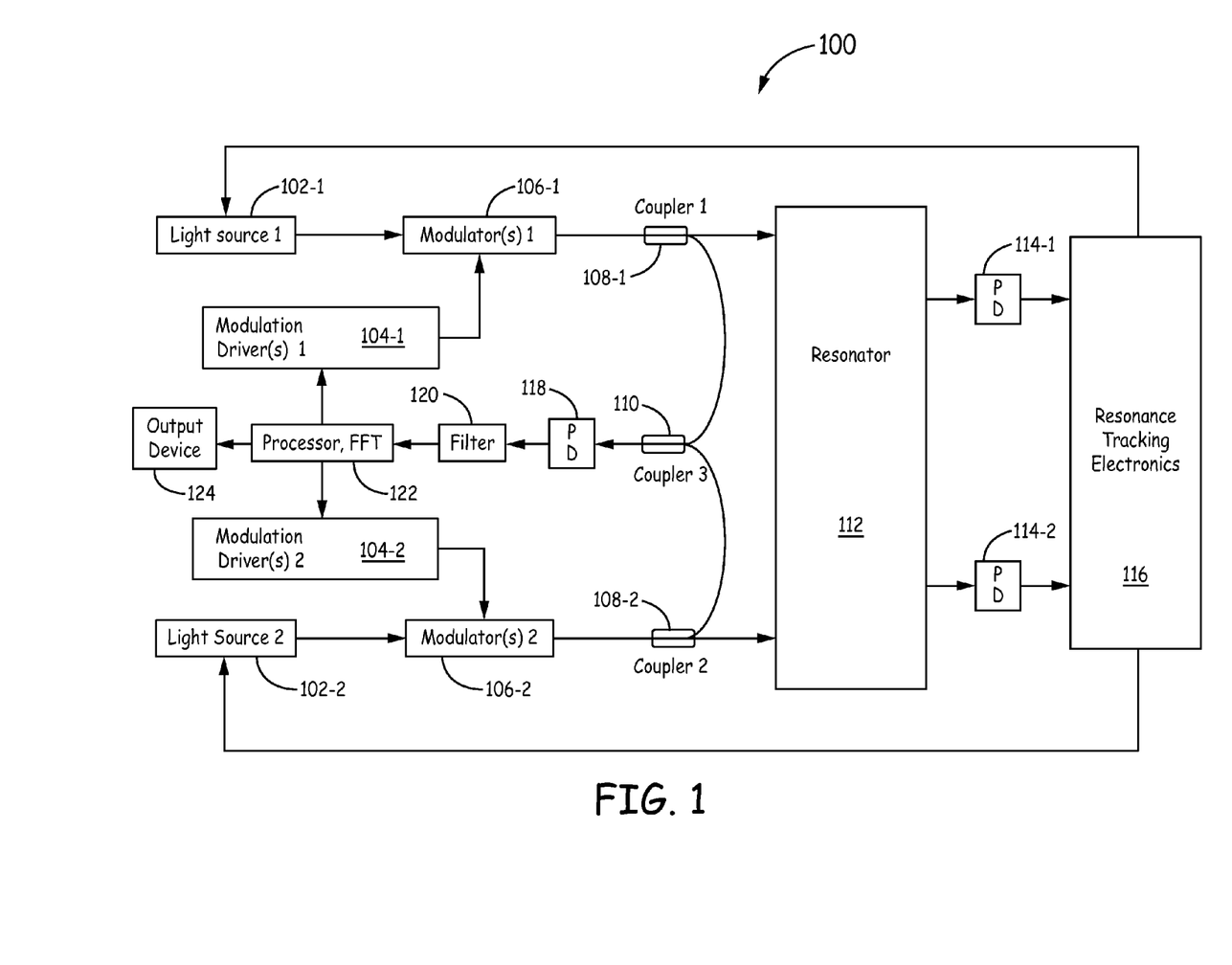
FIG. 1 is a block diagram of one embodiment of an exemplary enhanced resonator fiber optic gyroscope.

FIG. 1 is a block diagram of one embodiment of an exemplary resonator fiber optic gyroscope (RFOG) 100. The RFOG 100 includes a first light source 102-1 and a second light source 102-2. Each of light sources 102-1 and 102-2 generate a light beam or laser beam based on signals received from respective modulation drivers 104-1 and 104-2. Each of the generated light beams is monochromatic having a respective frequency. In addition, each of the generated light beams is modulated in respective modulators 106-1 and 106-2 based on signals received from the modulation drivers 104-1 and 104-2. In particular, the modulators 106-1 and 106-2 modulate the frequency and/or phase of the respective generated light beams to maintain the respective beams on resonance. In addition, the modulators 106-1 and 106-2 include intensity modulators, in some embodiments, which are configured to modulate the intensity of the respective light beam.

A first tap coupler 108-1 is coupled to an output of the first modulator 106-1 and a second tap coupler 108-2 is coupled to an output of the second modulator 106-2. Tap couplers 108-1 and 108-2 direct a portion or fraction of the respective modulated light beam to a beam combiner 110. The portion of the first modulated light beam is combined with the portion of the second modulated light beam in the coupler or beam combiner 110. The remaining portion of the first modulated light beam which is not directed to the beam combiner 110 enters the resonator 112 and propagates through the resonator 112 in a first direction, such as the clockwise direction. The remaining portion of the second modulated light beam which is not directed to the beam combiner 110 enters the resonator 112 and propagates through the resonator 112 in a second direction, such as the counter clockwise direction.

The clockwise light beam exits the resonator 112 and is detected by a photodetector 114-1. Similarly, the counter clockwise light beam exits the resonator 112 and is detected by a photodetector 114-2. The photodetectors 114 convert the light beam to an electrical signal as understood by one of skill in the art. The electrical signals are passed to resonance tracking electronics (RTE) 116. The resonance tracking electronics 116 provides feedback signals to the laser 102-1 and 102-2 to lock their frequencies to the resonance frequencies of the resonator in the corresponding direction (CW and CCW). The frequency difference of laser 102-1 and 102-2 contains information about the gyro rotation rates. Measurement of the frequency difference of 102-1 and 102-2 will be illustrated in more detail below.

As stated above, the portions of the first light beam and the second light beam directed by tap couplers 108-1 and 108-2 to the beam combiner 110 are combined in the beam combiner 110. However, as discussed above, each of the first and second light beams are modulated by modulators 106-1 and 106-2, respectively. Modulating the first and second light beams generates sidebands. Indeed, in some embodiments, the modulation generates a large number of sidebands for each of the first and second light beams. As understood by one of skill in the art, a sideband is a band of frequencies that are higher than or lower than the carrier frequency, containing power as a result of the modulation process.

Figure 2:
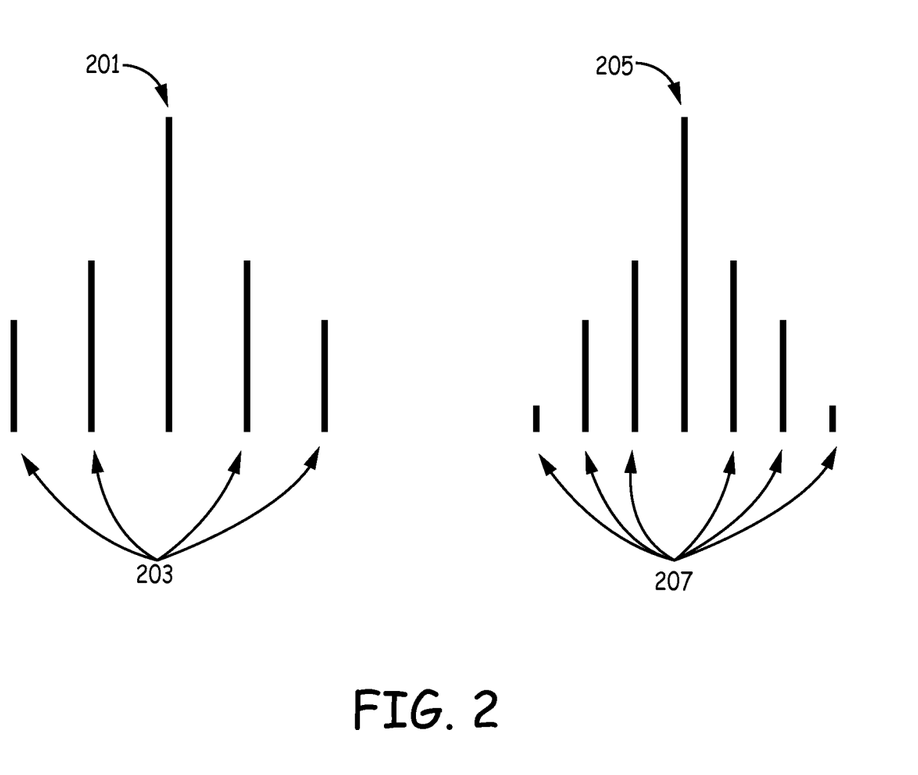
FIG. 2 depicts an exemplary representation of the optical power or amplitude of the modulated first and second light beams and the respective generated sidebands

For example, FIG. 2 depicts an exemplary representation of the optical power or amplitude of the modulated first and second light beams and the respective generated sidebands. In particular, FIG. 2 depicts a first carrier frequency 201 for the first light beam and a plurality of generated sidebands 203. In addition, FIG. 2 depicts a second carrier frequency 205 for the second light beam and the associated plurality of generated sidebands 207. The carrier frequencies 201 and 205 are the frequencies of interest which are locked on the resonances and used to detect rotation rate. It is to be understood that FIG. 2 is provided for purposes of explanation only. For example, although FIG. 2 depicts the first carrier frequency 201 and the second carrier frequency 205 with higher optical power/amplitude than the respective generated sidebands 203 and 207, it is to be understood that in some embodiments, one or more of the sidebands may have higher optical power than the respective carrier frequency. In addition, it is to be understood that the number of generated sidebands 203 and 207 shown in FIG. 2 are provided by way of example only and that more or fewer sidebands than those shown may be generated in different embodiments.

When the first modulated light beam and the second modulated light beam are combined in the beam combiner 110, a beat frequency between the first and second modulated light beams is produced. However, due to the presence of sidebands, a plurality of additional beat frequencies is also produced. In particular, each of the generated sidebands and the carrier frequency of the first modulated light beam mix with one or more of the carrier frequency and the generated sidebands of the second modulated light beam to produce a plurality of beat frequencies. The presence of multiple beat frequencies complicates and makes it difficult to track and measure the beat frequency between the carrier frequency of the first modulated light beam and the carrier frequency of the second modulated light beam. Additionally, as stated above, in some embodiments, a generated sideband may have higher optical power than the respective carrier frequency. Thus, simply picking the beat signal with the highest optical power can lead to incorrect measurements.

Whereas tracking and measuring the beat frequency of the carrier frequencies is difficult and problematic for conventional RFOGs, the RFOG 100 is better configured to perform such measurement and tracking of the frequency differences between the carrier frequencies of the first and second modulated light beams. Referring back to FIG. 1, the RFOG 100 includes a photodetector 118 configured to convert the combined optical signal from the beam combiner 110 into an electrical signal. A filter 120 is coupled to an output of the photodetector 118. The filter 120 is configured to select a range of frequencies. That is, the filter 120 selects a frequency range from the combined signal that includes the beat frequency of the carrier frequencies. Therefore, the filter 120 limits the bandwidth of the combined signal to an interested region. The filter 120 is implemented in this example as an electronic bandpass filter to limit the focus on the area of frequencies of interest.

Although the filter 120 is shown being coupled between an output of the photodetector 118 and an input of a processor 122 in this embodiment, it is to be understood that the configuration can be changed in other embodiments. For example, in one other embodiment, the filter 120 is an optical filter coupled between an output of the beam combiner 110 and an input of the photodetector 118. In such an embodiment, the filter selects the range of frequencies of interest prior to converting the optical signal to an electrical signal.

The filtered signal, having the range of frequencies which pass through the filter 120, is received at the processor 122. The processor 122 can be implemented, for example, as a field programmable gate array (FPGA), an application specific integrated circuit (ASIC) or a microprocessor. The processor 122 is configured to implement a fast Fourier transform (FFT) on the received signal to convert the time domain signal from the filter 120 into the frequency domain. After selecting a frequency component of interest, the processor 122 tracks how the frequency component changes over time, temperature, etc. In order to identify the beat frequency of the carrier frequencies, the processor 122 sends a signal to the modulation drivers 104-1 and 104-2 to turn off the modulators 106-1 and 106-2 temporarily. When the modulators 106-1 and 106-2 are turned off, the sidebands are not generated since the light beams do not undergo modulation. Hence, the only frequency component which appears in the frequency domain is the beat frequency between the carrier frequency of the first light beam and the carrier frequency of the second light beam.

After identifying the frequency component, the processor 122 sends a signal to the modulation drivers 104-1 and 104-2 to turn on the modulators 106-1 and 106-2. During operation, the frequency component of the beat frequency of the carrier signals typically does not jump discontinuously between frequencies, but rather shifts in continuous changes between frequencies as the light beams are modulated to be on resonance. Hence, once the beat frequency component of the FFT signal is identified, it can be tracked even though other components due to the sidebands are present. If, however, the beat frequency component of the carrier frequencies is lost, the processor 122 can direct the modulation drivers 104-1 and 104-2 to temporarily turn off the modulators 106-1 and 106-2 again in order to find the beat frequency component of the carrier frequencies.

By tracking the beat frequency component, the processor 122 is able to track the rotation rate. That is, the beat frequency component provides an indication of the rotation rate of the RFOG 100. The value of the beat frequency component is output from the processor 122 to an output device 124. In some embodiments, the output device is a display unit configured to display the rotation rate. In other embodiments, the output device is a navigation unit which uses the rotation rate to calculate a navigation solution, as understood by one of skill in the art. As understood by one of skill in the art, a navigation solution describes the location and/or movement of a vehicle.

Figure 3:
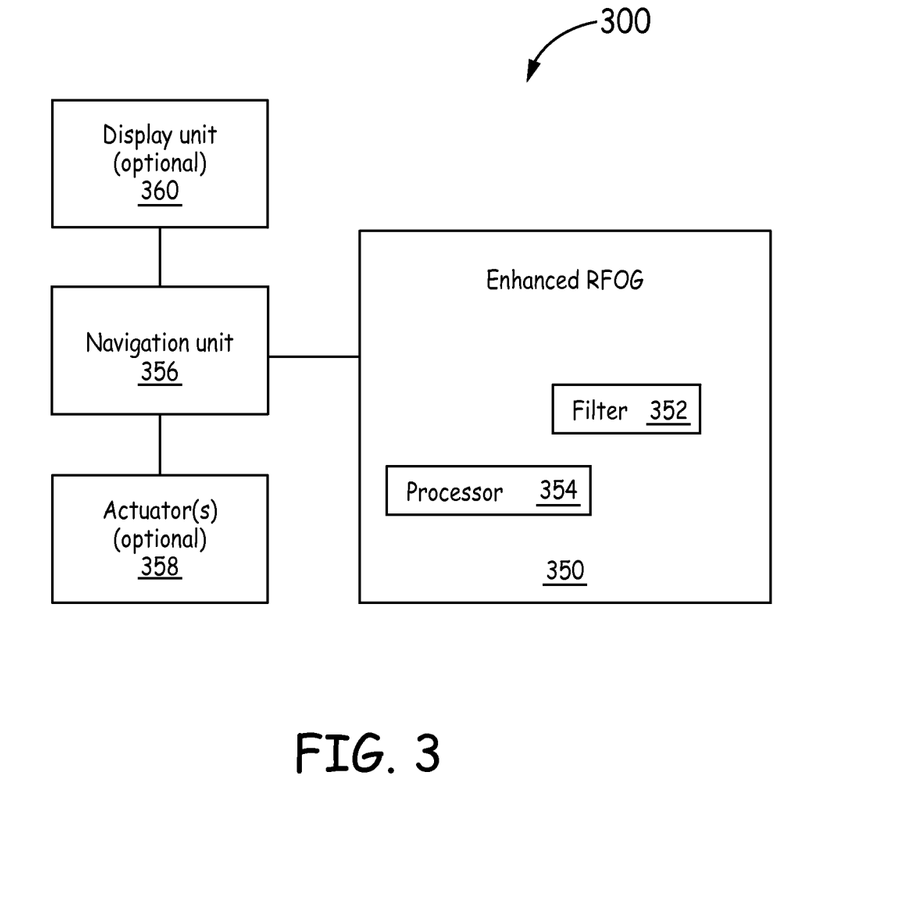
FIG. 3 is a block diagram of one embodiment of an exemplary system implementing an enhanced resonator fiber optic gyroscope.

For example, FIG. 3 is a block diagram of one embodiment of an exemplary system 300 implementing an enhanced resonator fiber optic gyroscope 350, such as RFOG 100 above. The enhanced RFOG 350 includes a filter 352, similar to filter 120 in FIG. 1, and a processor 354, similar to processor 122 in FIG. 1. In particular, the filter 352 limits the bandwidth of a combined signal which limits the number of sidebands in the combined signal. The processor 354 then performs an FFT on the time domain signal from the filter 352 to convert the signal to the frequency domain. The processor then identifies and tracks the beat frequency component of the carrier frequencies, as described above. The processor 354 then outputs a signal indicative of rotation rate to a navigation unit 356. The navigation unit 356 uses the measured rotation rate from the RFOG 350 to calculate parameters such as position, orientation, and angular velocity.

The navigation unit 356 uses the calculated parameters, in some embodiments, to calculate control signals that are output to one or more optional actuators 358. The actuators 358 are devices or components used to affect the motion of a vehicle in which the navigation system is located. For example, in some embodiments, the navigation unit 356 is implemented in an unmanned vehicle. Hence, the actuators 358 are implemented according to the vehicle type. For example, in an unmanned aerial vehicle, the actuators 358 are implemented as wing flaps, thruster, etc.

Additionally, in some embodiments, the navigation unit 356 outputs the calculated parameters to an optional display unit 360. For example, in some embodiments, the display unit 360 displays the geographic location, velocity, and/or orientation (e.g. pitch, roll, and/or yaw) of a vehicle in which the RFOG 35 is located. The display unit 360 can be implemented as any suitable display unit such as, but not limited to, various CRT, active and passive matrix LCD, and plasma display units.

Figure 4:
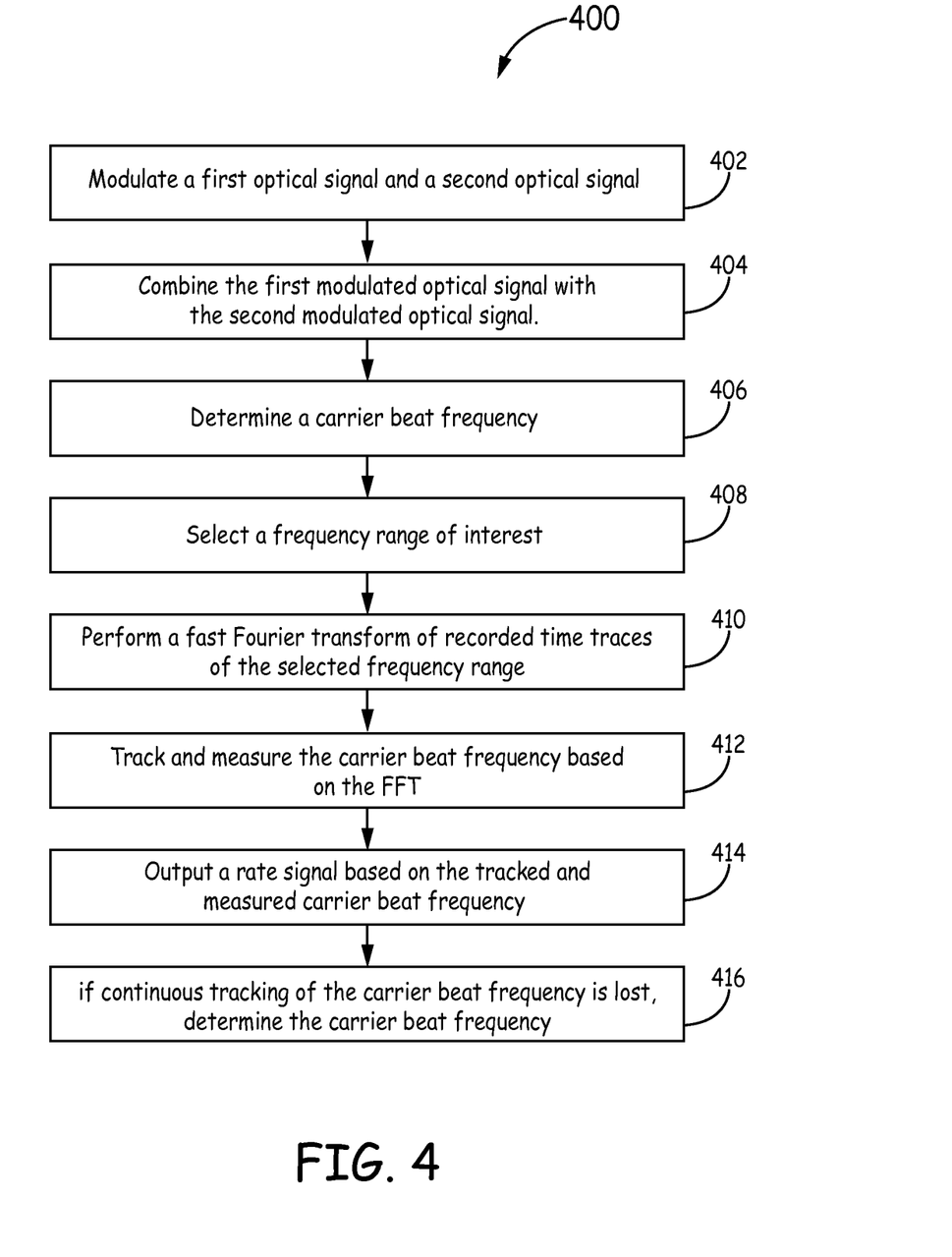
FIG. 4 is a flow chart depicting one embodiment of an exemplary method of measuring rotation rate in a resonator fiber optic gyroscope.

FIG. 4 is a flow chart of one embodiment of an exemplary method 400 of measuring beat frequency in a resonator fiber optic gyroscope. Method 400 is implemented in an enhanced RFOG such as RFOG 100 and RFOG 350 discussed above. At block 402, a first optical signal from a first light source and a second optical signal from a second light source are modulated. The first light source includes a first carrier frequency and the second light source includes a second carrier frequency. Modulation of the first and second optical signals introduces sideband frequencies into the respective first and second optical signals. As discussed above, sideband frequencies are frequencies that have a non-negligible amplitude and are not the carrier frequency.

At block 404, a fraction of the first modulated optical signal is combined with a fraction of the second modulated optical signal. Combining fractions of the first and second modulated optical signals produces a combined signal that includes a carrier beat frequency and sideband beat frequencies. As discussed above, a carrier beat frequency is a beat frequency between the first and second carrier frequencies, whereas a sideband beat frequency is a beat frequency between a sideband frequency and another sideband frequency or one of the carrier frequencies.

At block 406, a carrier beat frequency is determined. For example, in some embodiments, the carrier beat frequency is predetermined and stored in a memory associated with a processing unit in the RFOG. In other embodiments, the carrier beat frequency is not predetermined or known beforehand. In such embodiments, the carrier beat frequency is determined at run time, for example, through a discovery process such as the one described with respect to FIG. 5.

At block 408, a frequency range of interest close to and including the carrier beat frequency is selected. For example, in some embodiments, a filter is included, as described above, to limit the bandwidth or range of frequencies from a combined signal that is to be processed. In particular, the combined signal contains the beat frequencies of the carrier frequencies and the sidebands. Thus, the filter limits the range of beat frequencies that are processed. In some embodiments, the filter is an electronic bandpass filter which filters the output of a photodetector which converts the optical signal to an electrical signal. In other embodiments, the filter is an optical filter which filters the combined optical signal prior to entering the photodetector. At block 410, a fast Fourier transform of recorded time traces of the selected frequency range is performed, as discussed above. At block 412, the carrier beat frequency is tracked and measured over time through the FFT. In addition, in some embodiments, the FFT time series and time resolution are adjusted based on the numerical stability of the FFT so that high precision measurements can be obtained without losing track of the carrier beat frequency. For example in case the FFT generated beat frequency signal varies slowly, the duration of the time series for the FFT can be increased to allow more accurate determination of the slow frequency changes. In case the rotation rates changes quickly, the step size of the time series for FFT can be reduced to allow more accurate determination of fast frequency changes.

At block 414, a rate signal which represents the rotational rate of the RFOG is output. The output rate signal is based on the tracked and measured carrier beat frequency which is indicative of the rotational rate of the RFOG. At block 416, if continuous tracking of the carrier beat frequency is lost, the carrier beat frequency is determined or reacquired through the process described in FIG. 5. For example, a sudden frequency jump in one or both lasers can cause loss of the carrier beat frequency.

Figure 5:
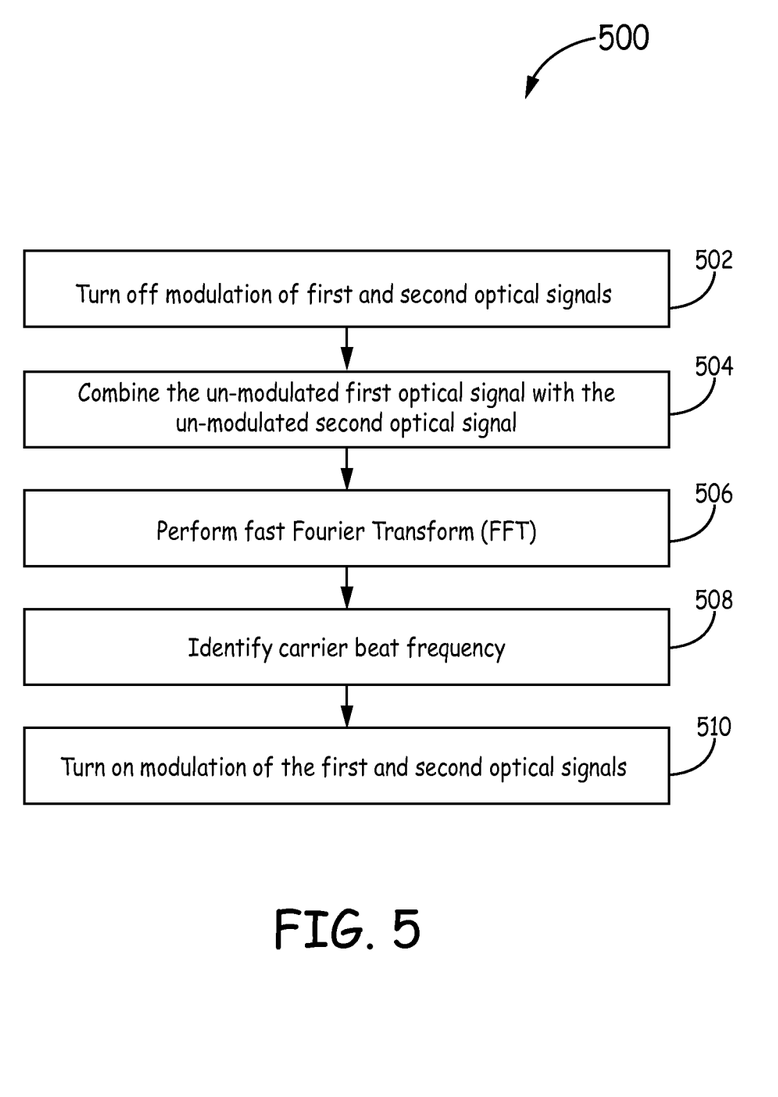
FIG. 5 is a flow chart depicting one embodiment of an exemplary method of determining the carrier beat frequency between two carrier frequencies.

FIG. 5 is a flow chart depicting one embodiment of an exemplary method 500 of determining the carrier beat frequency between two carrier frequencies. At block 502, the modulation of a first carrier frequency and a second carrier frequency is turned off for each of the respective lasers, such as lasers 102-1 and 202-2. At block 504, a fraction of a first optical signal containing the un-modulated first carrier frequency is combined with a fraction of a second optical signal containing the un-modulated second carrier frequency to produce a signal containing a carrier beat frequency without sideband beat frequencies. At block 506, an FFT is performed on the signal containing the carrier beat frequency without the sideband beat frequencies. At block 508, the carrier beat frequency is identified. In particular, since the carrier frequencies are un-modulated, sideband frequencies are not present to produce additional beat frequencies. Hence, by identifying the frequency in the FFT with the highest amplitude, the carrier beat frequency is identified. At block 510, modulation of the carrier frequencies is resumed or turned back on.

EXAMPLE EMBODIMENTS

Example 1 includes a method of measuring beat frequency in a resonator fiber optic gyroscope, the method comprising: modulating a first optical signal from a first light source and a second optical signal from a second light source, wherein the first modulated optical signal includes a first carrier frequency and a first plurality of sideband frequencies and the second modulated optical signal includes a second carrier frequency and a second plurality of sideband frequencies; combining a fraction of the first modulated optical signal with a fraction of the second modulated optical signal into a combined signal; determining a carrier beat frequency between the first carrier frequency and the second carrier frequency; selecting a frequency range from the combined signal that is close to and includes the carrier beat frequency; performing a fast Fourier transform (FFT) on an electrical signal representing the selected frequency range; tracking the carrier beat frequency based on the FFT; and outputting a rate signal based on the tracked carrier beat frequency, the rate signal indicating a rotation rate of the resonator fiber optic gyroscope.

Example 2 includes the method of Example 1, wherein determining the carrier beat frequency comprises: temporarily turning off modulation of the first optical signal and the second optical signal such that the first and second optical signals are unmodulated; combining a fraction of the unmodulated first optical signal with a fraction of the unmodulated second optical signal to produce a signal containing the carrier beat frequency without sideband beat frequencies; performing an FFT on the signal containing the carrier beat frequency without sideband beat frequencies; identifying the carrier beat frequency based on the FFT; and turning on modulation of the first optical signal and the second optical signal after identifying the carrier beat frequency.

Example 3 includes the method of any of Examples 1-2, wherein outputting the rate signal comprises outputting the rate signal to one of a navigation unit or a display unit.

Example 4 includes the method of any of Examples 1-3, wherein selecting the frequency range comprises: converting the combined signal to an electrical signal; and bandpass filtering the electrical signal.

Example 5 includes the method of any of Examples 1-4, wherein selecting the frequency range comprises: optically filtering the combined signal; and converting the filtered combined signal to an electrical signal.

Example 6 includes the method of any of Examples 1-5, wherein determining the initial carrier beat frequency comprises retrieving a stored, predetermined initial carrier beat frequency.

Example 7 includes the method of any of Examples 1-6, further comprising: reacquiring the carrier beat frequency when tracking of the carrier beat frequency is lost, wherein reacquiring the carrier beat frequency comprises: temporarily turning off modulation of the first optical signal and the second optical signal such that the first and second optical signals are unmodulated; combining a fraction of the unmodulated first optical signal with a fraction of the unmodulated second optical signal to produce a signal containing the carrier beat frequency without sideband beat frequencies; performing an FFT on the signal containing the carrier beat frequency without sideband beat frequencies; identifying the carrier beat frequency based on the FFT; and turning on modulation of the first optical signal and the second optical signal after identifying the carrier beat frequency.

Example 8 includes a resonator fiber optic gyroscope comprising: a first light source configured to produce a first laser beam having a first carrier frequency; a second light source configured to produce a second laser beam having a second carrier frequency; a first modulator coupled to the first light source and configured to modulate the first laser beam, the modulated first laser beam comprising the first carrier frequency and a first plurality of sideband frequencies; a second modulator coupled to the second light source and configured to modulate the second laser beam, the modulated second laser beam comprising the second carrier frequency and a second plurality of sideband frequencies; a first optical coupler coupled to an output of the first modulator and configured to split off a portion of the modulated first laser beam; a second optical coupler coupled to an output of the second modulator and configured to split off a portion of the modulated second laser beam; a beam combiner coupled to the first optical coupler and the second optical coupler; the beam combiner configured to combine the portion split off the modulated first laser beam with the portion split off the modulated second laser beam to produce a combined signal containing a carrier beat frequency between the first carrier frequency and the second carrier frequency; a filter configured to select a range of frequencies in the combined signal; a photodetector configured to convert the combined signal to an electrical signal; and a processor configured to perform a fast Fourier transform (FFT) on the filtered electrical signal, to track the carrier beat frequency based on the FFT, and to output a rate signal based on the carrier beat frequency which indicates a rotation rate of the resonator fiber optic gyroscope.

Example 9 includes the resonator fiber optic gyroscope of Example 8, wherein the filter is an optical filter coupled between an output of the beam combiner and an input of the photodetector such that the photodetector converts a filtered optical signal containing the selected range of frequencies into an electrical signal.

Example 10 includes the resonator fiber optic gyroscope of any of Examples 8-9, wherein the photodetector is coupled between an output of the beam combiner and an input of the filter; wherein the filter is an electrical bandpass filter configured to filter an electrical signal output from the photodetector to select the range of frequencies.

Example 11 includes the resonator fiber optic gyroscope of any of Examples 8-10, wherein the processor is further configured to identify the carrier beat frequency by outputting a command to the first modulator and to the second modulator to turn off modulation of the first laser beam and the second laser beam such that the first laser beam and the second laser beam are unmodulated; wherein the beam combiner combines a portion of the unmodulated first laser beam with a portion of the unmodulated second laser beam to produce a combined signal containing the carrier beat frequency without sideband beat frequencies; wherein the processor is further configured to perform an FFT on the combined signal containing the carrier beat frequency without sideband beat frequencies; to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

Example 12 includes the resonator fiber optic gyroscope of any of Examples 8-11, wherein when the processor loses track of the carrier beat frequency, the processor is configured to reacquire the carrier beat frequency by outputting a command to the first modulator and to the second modulator to turn off modulation of the first laser beam and the second laser beam such that the first laser beam and the second laser beam are unmodulated; wherein the beam combiner combines a portion of the unmodulated first laser beam with a portion of the unmodulated second laser beam to produce a combined signal containing the carrier beat frequency without sideband beat frequencies; wherein the processor is further configured to perform an FFT on the combined signal containing the carrier beat frequency without sideband beat frequencies; to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

Example 13 includes the resonator fiber optic gyroscope of any of Examples 8-12, wherein the processor is configured to output the rate signal to one of a navigation unit or a display unit.

Example 14 includes the resonator fiber optic gyroscope of any of Examples 8-13, wherein the processor is further configured to adjust a time series size and time resolution of the FFT according to the numerical stability of the FFT.

Example 15 includes a navigation system comprising: a resonator fiber optic gyroscope (RFOG) configured to measure rotation rate; and a navigation unit configured to receive the measurements of rotation rate from the RFOG and to calculate a navigation solution based on the measured rotation rate; wherein the RFOG comprises: a first light source configured to produce a first laser beam having a first carrier frequency; a second light source configured to produce a second laser beam having a second carrier frequency; a first modulator coupled to the first light source and configured to modulate the first laser beam, the modulated first laser beam comprising the first carrier frequency and a first plurality of sideband frequencies; a second modulator coupled to the second light source and configured to modulate the second laser beam, the modulated second laser beam comprising the second carrier frequency and a second plurality of sideband frequencies; a first optical coupler coupled to an output of the first modulator and configured to split off a portion of the modulated first laser beam; a second optical coupler coupled to an output of the second modulator and configured to split off a portion of the modulated second laser beam; a beam combiner coupled to the first optical coupler and the second optical coupler; the beam combiner configured to combine the portion split off the modulated first laser beam with the portion split off the modulated second laser beam to produce a combined signal containing a carrier beat frequency between the first carrier frequency and the second carrier frequency; a filter configured to select a range of frequencies in the combined signal; a photodetector configured to convert the combined signal to an electrical signal; and a processor configured to perform a fast Fourier transform (FFT) on the filtered electrical signal, to track the carrier beat frequency based on the FFT, and to output a rate signal to the navigation unit, wherein the rate signal is based on the carrier beat frequency and indicates the measured rotation rate of the resonator fiber optic gyroscope.

Example 16 includes the navigation system of Example 15, further comprising one or more actuators coupled to the navigation unit; wherein the navigation unit outputs commands to the one or more actuators based on the calculated navigation solution.

Example 17 includes the navigation system of any of Examples 15-16, further comprising a display unit; wherein the navigation unit is configured to output the navigation solution to a display unit.

Example 18 includes the navigation system of any of Examples 15-17, wherein the photodetector is coupled between an output of the beam combiner and an input of the filter; wherein the filter is an electrical bandpass filter configured to filter an electrical signal output from the photodetector to select the range of frequencies.

Example 19 includes the navigation system of any of Examples 15-18, wherein the processor is further configured to identify the carrier beat frequency by outputting a command to the first modulator and to the second modulator to turn off modulation of the first laser beam and the second laser beam such that the first laser beam and the second laser beam are unmodulated; wherein the beam combiner combines a portion of the unmodulated first laser beam with a portion of the unmodulated second laser beam to produce a combined signal containing the carrier beat frequency without sideband beat frequencies; wherein the processor is further configured to perform an FFT on the combined signal containing the carrier beat frequency without sideband beat frequencies; to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

Example 20 includes the navigation system of any of Examples 15-19, wherein when the processor loses track of the carrier beat frequency, the processor is configured to reacquire the carrier beat frequency by outputting a command to the first modulator and to the second modulator to turn off modulation of the first laser beam and the second laser beam such that the first laser beam and the second laser beam are unmodulated; wherein the beam combiner combines a portion of the unmodulated first laser beam with a portion of the unmodulated second laser beam to produce a combined signal containing the carrier beat frequency without sideband beat frequencies; wherein the processor is further configured to perform an FFT on the combined signal containing the carrier beat frequency without sideband beat frequencies; to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A resonator fiber optic gyroscope comprising:
a first light source configured to produce a first laser beam having a first carrier frequency;
a second light source configured to produce a second laser beam having a second carrier frequency;
a first modulator coupled to the first light source and configured to modulate the first laser beam, the modulated first laser beam comprising the first carrier frequency and a first plurality of sideband frequencies;
a second modulator coupled to the second light source and configured to modulate the second laser beam, the modulated second laser beam comprising the second carrier frequency and a second plurality of sideband frequencies;

a first optical coupler coupled to an output of the first modulator and configured to split off a portion of the modulated first laser beam;

a second optical coupler coupled to an output of the second modulator and configured to split off a portion of the modulated second laser beam;

a beam combiner coupled to the first optical coupler and the second optical coupler; the beam combiner configured to combine the portion split off the modulated first laser beam with the portion split off the modulated second laser beam to produce a combined signal containing a carrier beat frequency between the first carrier frequency and the second carrier frequency;

a filter configured to select a range of frequencies in the combined signal;

a photodetector configured to convert the combined signal to an electrical signal; and a processor configured to perform a fast Fourier transform (FFT) on the filtered electrical signal, to track the carrier beat frequency based on the FFT, and to output a rate signal based on the carrier beat frequency which indicates a rotation rate of the resonator fiber optic gyroscopes;

wherein the processor is further configured to identify the carrier beat frequency by outputting a command to the first modulator and to the second modulator to turn off modulation of the first laser beam and the second laser beam such that the first laser beam and the second laser beam are unmodulated;

wherein the beam combiner combines a portion of the unmodulated first laser beam with a portion of the unmodulated second laser beam to produce a combined signal containing the carrier beat frequency without sideband beat frequencies; and wherein the processor is further configured to perform the FFT on the combined signal containing the carrier beat frequency without sideband beat frequencies, to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

2. The resonator fiber optic gyroscope of claim 1, wherein the filter is an optical filter coupled between an output of the beam combiner and an input of the photodetector such that the photodetector converts a filtered optical signal containing the selected range of frequencies into an electrical signal.

3. The resonator fiber optic gyroscope of claim 1, wherein the photodetector is coupled between an output of the beam combiner and an input of the filter;

wherein the filter is an electrical bandpass filter configured to filter an electrical signal output from the photodetector to select the range of frequencies.

4. The resonator fiber optic gyroscope of claim 1, wherein when the processor loses track of the carrier beat frequency, the processor is configured to reacquire the carrier beat frequency by outputting a command to the first modulator and to the second modulator to turn off modulation of the first laser beam and the second laser beam such that the first laser beam and the second laser beam are unmodulated;

wherein the beam combiner combines a portion of the unmodulated first laser beam with a portion of the unmodulated second laser beam to produce a combined signal containing the carrier beat frequency without sideband beat frequencies;

wherein the processor is further configured to perform an FFT on the combined signal containing the carrier beat frequency without sideband beat frequencies; to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

5. The resonator fiber optic gyroscope of claim 1, wherein the processor is configured to output the rate signal to one of a navigation unit or a display unit.

6. The resonator fiber optic gyroscope of claim 1, wherein the processor is further configured to adjust a time series size and time resolution of the FFT according to the numerical stability of the FFT.

7. A navigation system comprising:
a resonator fiber optic gyroscope (RFOG) configured to measure rotation rate; and
a navigation unit configured to receive the measurements of rotation rate from the RFOG and to calculate a navigation solution based on the measured rotation rate;
wherein the RFOG comprises:
a first light source configured to produce a first laser beam having a first carrier frequency;
a second light source configured to produce a second laser beam having a second carrier frequency;
a first modulator coupled to the first light source and configured to modulate the first laser beam, the modulated first laser beam comprising the first carrier frequency and a first plurality of sideband frequencies;
a second modulator coupled to the second light source and configured to modulate the second laser beam, the modulated second laser beam comprising the second carrier frequency and a second plurality of sideband frequencies;
a first optical coupler coupled to an output of the first modulator and configured to split off a portion of the modulated first laser beam;
a second optical coupler coupled to an output of the second modulator and configured to split off a portion of the modulated second laser beam;
a beam combiner coupled to the first optical coupler and the second optical coupler; the beam combiner configured to combine the portion split off the modulated first laser beam with the portion split off the modulated second laser beam to produce a combined signal containing a carrier beat frequency between the first carrier frequency and the second carrier frequency;
a filter configured to select a range of frequencies in the combined signal;
a photodetector configured to convert the combined signal to an electrical signal; and
a processor configured to perform a fast Fourier transform (FFT) on the filtered electrical signal, to track the carrier beat frequency based on the FFT, and to output a rate signal to the navigation unit, wherein the rate signal is based on the carrier beat frequency and indicates the measured rotation rate of the resonator fiber optic gyroscope;
wherein the processor is further configured to identify the carrier beat frequency by outputting a command to the first modulator and to the second modulator to turn off modulation of the first laser beam and the second laser beam such that the first laser beam and the second laser beam are unmodulated;

wherein the beam combiner combines a portion of the unmodulated first laser beam with a portion of the unmodulated second laser beam to produce a combined signal containing the carrier beat frequency without sideband beat frequencies; and wherein the processor is further configured to perform the FFT on the combined signal containing the carrier beat frequency without sideband beat frequencies, to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

8. The navigation system of claim 7, further comprising one or more actuators coupled to the navigation unit;
wherein the navigation unit outputs commands to the one or more actuators based on the calculated navigation solution.

9. The navigation system of claim 7, further comprising a display unit;
wherein the navigation unit is configured to output the navigation solution to a display unit.

10. The navigation system of claim 7, wherein the photodetector is coupled between an output of the beam combiner and an input of the filter;
wherein the filter is an electrical bandpass filter configured to filter an electrical signal output from the photodetector to select the range of frequencies.

11. The navigation system of claim 7, wherein when the processor loses track of the carrier beat frequency, the processor is configured to reacquire the carrier beat frequency by outputting a command to the first modulator and to the second modulator to turn off modulation of the first laser beam and the second laser beam such that the first laser beam and the second laser beam are unmodulated;
wherein the beam combiner combines a portion of the unmodulated first laser beam with a portion of the unmodulated second laser beam to produce a combined signal containing the carrier beat frequency without sideband beat frequencies;
wherein the processor is further configured to perform an FFT on the combined signal containing the carrier beat frequency without sideband beat frequencies; to identify the carrier beat frequency based on the FFT of the combined signal containing the carrier beat frequency without sideband beat frequencies, and to output a command to the first modulator and to the second modulator to turn on modulation of the first laser beam and the second laser beam after identifying the carrier beat frequency.

* * * * *